United States Patent Office 2,855,907
Patented Oct. 14, 1958

2,855,907

INTERNAL COMBUSTION ENGINE SYSTEM

Siegfried Meurer and Julius Liebel, Nurnberg, Germany, assignors to Maschinenfabrik Augsburg-Nurnberg A. G., Nurnberg, Germany Application March 21, 1955, Serial No. 495,498

Claims priority, application Germany March 20, 1954

7 Claims. (Cl. 123—32)

This invention relates to an improved method of operating an internal combustion engine and to an internal combustion engine adapted to operate after this method.

In the copending application Ser. No. 480,432 dated January 7, 1955, a method and arrangement has been described for ensuring a smooth run of diesel engines and avoiding the hard diesel knock with its inherent high mechanical losses and wear.

In the said method, contrary to the conventional aim of attaining an immediate mixing of the fuel with the air for combustion, the direction of the fuel sprays is intended to achieve application of the fuel on the wall of the combustion chamber without reflection so that it is distributed over the wall of the combustion chamber in the form of a thin film. Said thin film, spread over a large surface, is released from the wall of the combustion chamber by the air-flow, and only during the releasing phase the vaporized fuel is admixed with air and the mixture is burnt, whereby a quiet run and yet a low specific fuel consumption is attained.

In the said copending application it has been contemplated to apply the fuel on the walls of a combustion chamber arranged in the piston and shaped in accordance with a body generated by rotation. Also, arrangements have been disclosed in the said application in which the combustion chamber has been arranged in the cylinder, in the form of a turbulence chamber or of a swirl chamber.

According to the present invention, the method is applied in connection with a diesel engine having a combustion chamber which is of the prechamber or precombustion chamber type and more particularly is disposed in the cylinder; in the prechamber, a regular and very strong rotation of the air is produced and the liquid fuel is directly applied on the wall of the pre-combustion chamber, in the direction of this air rotation, i. e., without traversing the air current.

The precombustion chamber for carrying out the method according to the invention preferably has a shape generated by rotation and may be arranged both concentrical or eccentrical to the axis of the cylinder. It is important that the combustion chamber is arranged in such a way that a very strong and regular motion of the air can be established therein, which is capable of releasing in a vaporous form the fuel applied on the wall of the combustion chamber. The rotation of the air will be most favorable if the transfer channels communicating with the compression chamber of the cylinder merge into the wall of the combustion chamber at an angle which is as flat as possible, i. e. at an angle which is as acute as possible in relation to the plane of the head of the piston or of the cylinder. In this case, with an upright engine having in the cylinder head a precombustion chamber generated by rotation, the injection nozzle advantageously will be laterally arranged in a plane of maximum diameter of the combustion chamber, and the spray direction of the fuel injection is nearly parallel to the plane of the cylinder or piston head, respectively.

Other and further objects, features and advantages of the invention will be pointed out hereinafter and appear in the appended claims forming part of the application.

In the accompanying drawings several now preferred embodiments of the invention are shown by way of illustration and not by way of limitation.

Similar reference numerals denote similar parts in the different views.

Figure 1:
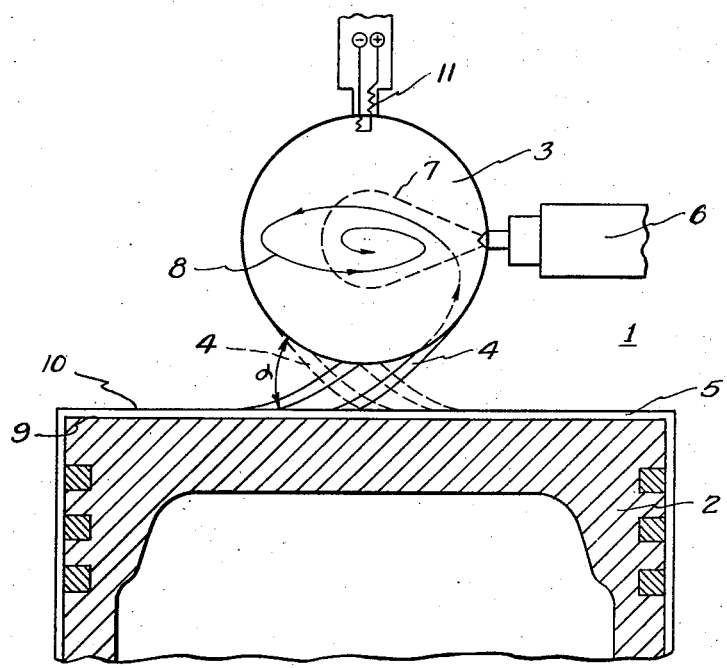
Fig. 1 is a sectional view, partly in a diagrammatic form, showing a piston and a concentric prechamber arranged in the cylinder head.
Figure 2:
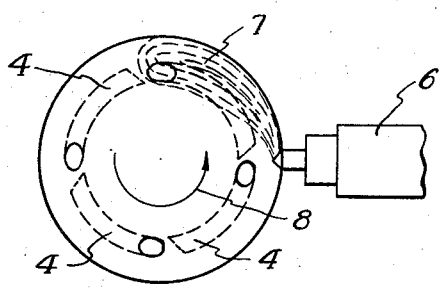
Fig. 2 is a plan view of the prechamber.

Referring now to the drawings in greater detail, and first to Figs. 1 and 2, it will be seen that the cylinder head 1, not shown in detail, is formed with a combustion chamber 3 arranged concentrically to the cylinder axis, in the form of a prechamber, and communicating with the working space 5 of the cylinder, through helically formed transfer channels 4. The piston 2 is shown in Fig. 1 in its upper dead center position, so that the working space 5 of the cylinder is reduced to a small gap. The combustion chamber is shaped as a body generated by rotation and in the example is spherically shaped, and the injection nozzle 6 is laterally arranged in a diametrical plane of the combustion chamber in such a way that the fuel injected in the form of one or more fuel sprays 7 is deposited directly on the wall of the combustion chamber 3, i. e. without traversing the air jets, in the direction of the rotation of the air (arrow 8) forced into the combustion chamber through the channels 4 during the compression stroke. To promote further the rotation of the air, channels 4 are helically curved and substantially tangentially enter the cylinder head surface 10. This enables the use of a plurality of channels to increase the amount of air compressed into chamber 3 without destroying the rotary air motion. The transfer channels 4 enter into the combustion chamber in a tangential direction to the periphery of the combustion chamber, or at an acute angle α in relation to the plane of the piston head surface 9 or of the cylinder head 10, respectively, said angle being as small as possible, so that the plane of the air vortex 8 substantially coincides as to its direction with the plane of the spray or sprays 7 of the injected fuel. In this way the rotating air current helps to extend the fuel spray 7 on the wall of the combustion chamber and gradually releases the vaporized fuel from said wall. If necessary, an auxiliary glow plug 11 may be used as an aid for starting.

Figure 3:
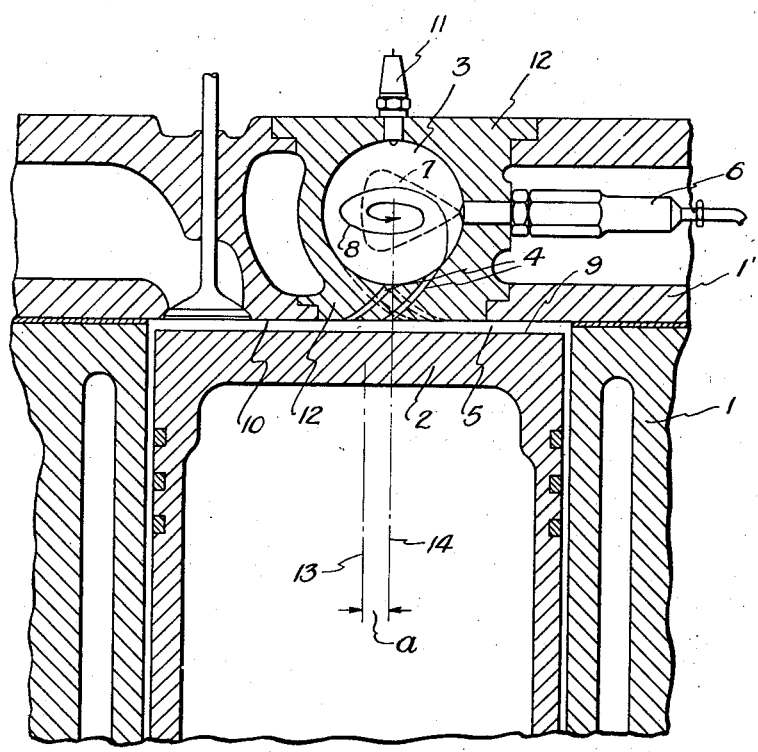
Fig. 3 is a fragmentary sectional view of a cylinder and piston head unit having an eccentric prechamber arranged in a separate insert.

By way of alternative, the combustion chamber 3 may be arranged eccentrically to the cylinder axis, as indicated in Fig. 3. This arrangement of the combustion chamber offers certain constructional and operational advantages regarding the position of the injection nozzle 6 in relation to the space of the prechamber.

Referring to Fig. 3 it will also be seen that the channels 4 in this case are accommodated in a separate eccentric prechamber insert 12 inserted in the cylinder cover 1', as known per se. For the rest the arrangement may be identical with that described with reference to Figs. 1 and 2. The eccentricity between the axis 13 of the cylinder and the axis 14 of the combustion chamber is denoted "a."

As is well known, the transfer passages in prechamber engines have a relatively narrow cross section. Therefore, the air is subjected to a kind of nozzle effect which is very favorable for detaching the vaporized fuel from the wall of the combustion chamber. The channels 4 may even be dimensioned in such a way that the movement of the air produced therein comes into the range of over-critical velocity of flow. The rotation of the air may be promoted by imparting already to the air entering into the cylinder a rotational motion (so-called initial rotation of the air).

It has been found that the process according to the invention can be carried out most efficiently if the wall of the combustion chamber is kept at a relatively low temperature.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

We claim:

1. In an internal combustion engine having a cylinder, a cylinder head and piston structures constructed and arranged to provide in said cylinder head a precombustion chamber in which fuel is to be ignited, air channels extending helically from the cylinder side surface of said cylinder head and opening into said chamber in a direction substantially tangent to the wall of the chamber for creating swirling movement of air in one direction in said precombustion chamber, means including an injection nozzle for injecting liquid fuel into said precombustion chamber, said nozzle being oriented to discharge fuel generally tangentially to the wall of said precombustion chamber in the direction of the air swirl to form a film of liquid fuel thereon, and said nozzle being positioned a short distance from the point of impingement of the injected fuel on such wall to minimize the atomization of fuel.

2. In an engine as in claim 1, said air channels having openings into said precombustion chamber symmetrically disposed around the wall of said chamber.

3. In an engine as in claim 2, said nozzle being positioned transversely of said plane and in the path of the air swirl.

4. In an engine as in claim 1, said chamber being concentric with the cylinder axis.

5. In an engine as in claim 1, said chamber being eccentric with the cylinder axis.

6. In an engine as in claim 1, further comprising a glow plug in said chamber.

7. In an engine as in claim 1, said channels further extending substantially tangentially from the cylinder side surface of said cylinder head.

References Cited in the file of this patent

UNITED STATES PATENTS 2,808,036     Von Seggern et al.     Oct. 1, 1957

FOREIGN PATENTS 38,003     Austria     July 26, 1909
394,403     Great Britain     June 29, 1933
404,030     Great Britain     Jan. 8, 1934
643,351     Great Britain     Sept. 20, 1950
870,277     France     Dec. 5, 1941

OTHER REFERENCES

High-Speed Diesel Engines by P. M. Heldt, Sixth Edition, P. M. Heldt, Nyack, N. Y., 1950; page 262.